United States Patent [19]

Becker et al.

[11] 4,282,904
[45] Aug. 11, 1981

[54] ARTICLE OF MANUFACTURE COMPRISING A HOLLOW ROD OF LONGITUDINALLY GATHERED TUBING WITH A SUPPORT SHEATH SURROUNDING THE HOLLOW ROD, PROCESS FOR PRODUCING SAME, AND USE OF THE ARTICLE IN PRODUCING SAUSAGES

[75] Inventors: Reinhold Becker; Wolfgang Michel, both of Wiesbaden, Fed. Rep. of Germany

[73] Assignee: Hoechst Aktiengesellschaft, Frankfurt am Main, Fed. Rep. of Germany

[21] Appl. No.: 100,745

[22] Filed: Dec. 6, 1979

[30] Foreign Application Priority Data

Dec. 11, 1978 [DE] Fed. Rep. of Germany ....... 2853400

[51] Int. Cl.³ .................................................. F16 9/00
[52] U.S. Cl. ................................... 138/109; 138/110; 138/118.1; 138/137; 206/446; 206/525; 206/802; 229/93; 426/105; 428/36
[58] Field of Search .................. 229/93; 206/446, 525, 206/802; 428/36; 138/118.1, 109, 110, 137; 426/105

[56] References Cited

U.S. PATENT DOCUMENTS

| 1,449,073 | 3/1923 | Thom | 206/446 |
|---|---|---|---|
| 1,719,405 | 7/1929 | Townsend | 206/446 |
| 2,028,691 | 1/1936 | Schenk | 206/446 |
| 2,043,829 | 6/1936 | Grant et al. | 206/446 |
| 2,105,368 | 1/1938 | Parsons | 206/59 |
| 2,150,471 | 3/1939 | Vulpen | 138/118 |
| 2,224,504 | 12/1940 | Milmoe | 206/446 |
| 2,871,508 | 2/1959 | Hill | 138/118.1 |
| 2,933,866 | 4/1960 | Cranston | 206/446 |
| 3,051,368 | 8/1962 | Schneider | 229/17 |
| 3,148,992 | 9/1964 | Hewitt | 138/118.1 |
| 3,446,634 | 5/1969 | Stahlberger | 426/105 |
| 3,528,825 | 9/1970 | Doughty | 426/105 |
| 3,639,130 | 2/1972 | Eichin et al. | 426/105 |
| 3,864,494 | 2/1975 | Kupcikevicius et al. | 426/284 |
| 3,942,568 | 3/1976 | Stemmler | 150/1 |
| 4,007,761 | 2/1977 | Beckman | 426/135 |
| 4,013,099 | 3/1977 | Gerigk et al. | 138/118.1 |
| 4,033,382 | 7/1977 | Eichin et al. | 138/118.1 |
| 4,064,673 | 12/1977 | Gerigk et al. | 138/118.1 |
| 4,132,047 | 1/1979 | Gerigk et al. | 138/118.1 |

FOREIGN PATENT DOCUMENTS

2733996  2/1979  Fed. Rep. of Germany .
2291015  6/1976  France .
2397791  2/1979  France .
2001234  1/1979  United Kingdom .

*Primary Examiner*—William R. Dixon, Jr.
*Attorney, Agent, or Firm*—Schwartz, Jeffery, Schwaab, Mack, Blumenthal & Koch

[57] ABSTRACT

An article of manufacture useful in the production of sausages comprising a hollow rod consisting of longitudinally gathered packing tube and a surrounding support sheath of formable sheet material, such as polyethylene, with integral end walls each having a central opening therein, said integral end walls being formed by longitudinally axially twisting the end portions of the sheath and thereafter longitudinally compressing and buckling the twisted ends of the sheath; the openings in the ends walls of the support sheath allowing insertion of a filling tube of a filling machine into the hollow rod in the interior cavity of the support sheath and permitting ready withdrawal of the end of the packing tube from the support sheath in order to form a closed end on the tube prior to extruding sausage meat into the tube.

2 Claims, 1 Drawing Figure

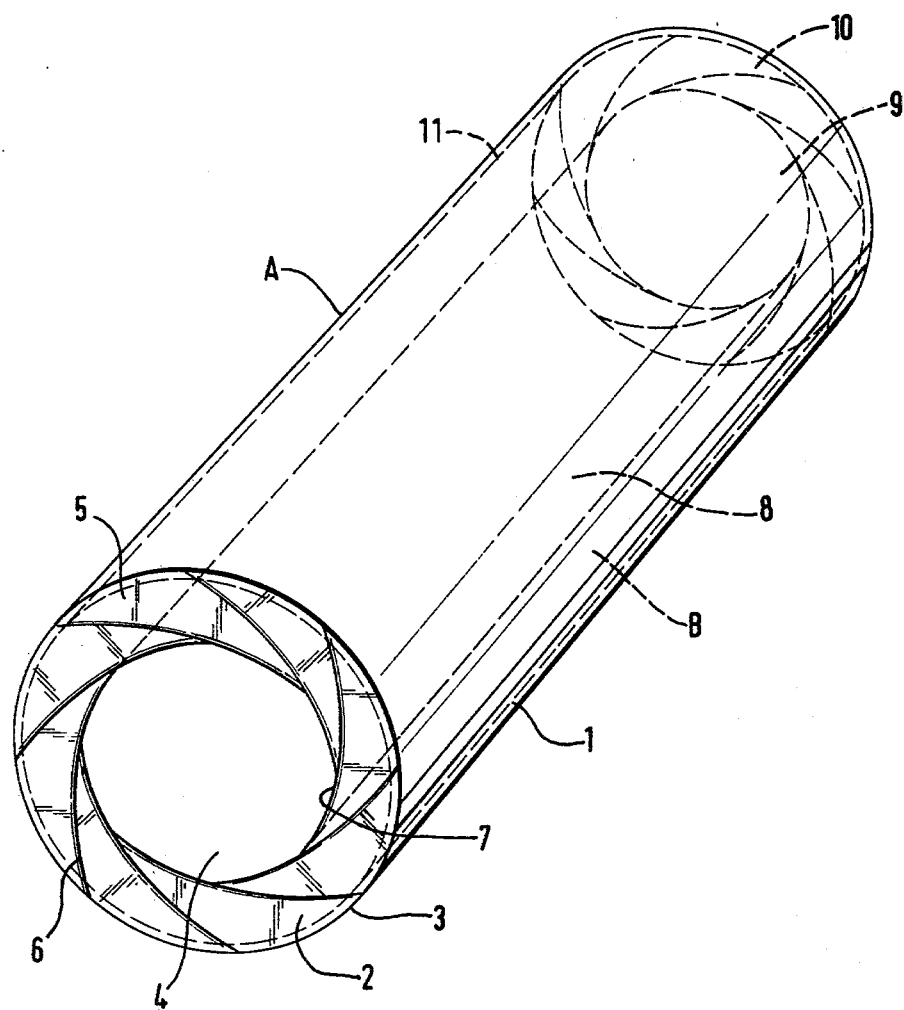

ARTICLE OF MANUFACTURE COMPRISING A HOLLOW ROD OF LONGITUDINALLY GATHERED TUBING WITH A SUPPORT SHEATH SURROUNDING THE HOLLOW ROD, PROCESS FOR PRODUCING SAME, AND USE OF THE ARTICLE IN PRODUCING SAUSAGES

This invention relates to a uniform article of manufacture which can be readily handled, consisting of a hollow rod of a longitudinally gathered and compressed piece of tubing and of a container-like support sheath having a characteristic end wall construction with a central opening. Preferably the tubing is made of fiber-reinforced cellulose hydrate. The sheath surrounds the hollow rod while leaving the openings leading into its hollow space free.

The invention further relates to a process for producing the article and to the use of the article in the production of sausages. The article can be readily handled or manipulated uniformly and consists of a hollow rod with a support sheath. The body in the shape of a hollow cylinder consisting of longitudinally gathered tubing is hereinafter referred to as the "hollow rod".

The sheathing, consisting of a formable sheet, is called a "support sheath". It has the shape of a container in the form of a hollow cylinder, the hollow space of which is limited at each end by container end walls having a characteristic construction or design.

Hollow rods of a longitudinally gathered packing tube are used in the production of sausages. Such tubes may be made of cellulose hydrate which preferably is fiber-reinforced. In this regard, hollow rods to be filled with sausage meat are pushed onto the filling tube of a filling machine, and sausage meat is pressed out through the filling tube into the hollow cavity of the hollow rod which is closed at one end. The gathered tubing forming the hollow rod is then filled with sausage meat, unfolding continuously while the hollow rod becomes correspondingly shorter.

Before the hollow rods are used in accordance with their intended purpose, they are usually soaked in water or moistened. Hollow rods which are wet with water, however, have a tendency to expand considerably in the longitudinal or axial direction, and their dimensional stability is no longer ensured to the desired degree. This leads to problems in handling the hollow rods.

According to a proposal which is not as yet part of the state of the art (DE Patent Application No. 28 09 585.4), a hollow rod with a support sheath is described which has openings at its front ends bounded by integral toroids formed with irregular edges. The support sheath has the disadvantage that its outlet openings are not precisely circular and, additionally, that each opening is bounded by a toroid which can have sharp and hard edges. This gives rise to the danger that during or immediately before use of the article of manufacture in accordance with its intended purpose, the start of the packing tube, gathered to form a hollow rod, cannot be gripped in order to pull it from the opening of the support sheath in order to form a closed end from this end section of the tube. Due to the sharp edges of the toroid at the support sheath, there is an additional danger that the packing tube may be damaged as it is pulled out of the support sheath.

In DE-OS No. 2,510,637 there is described a hollow rod of a longitudinally gathered packing tube encased with a support sheath. The support sheath is constructed of two parts, namely, a tubular sheath section and an annular element of stable shape, for fixing the tubular sheath to and around the hollow rod, as an end of the support sheath. This support sheath has the disadvantage, however, that its overturned portions must be relatively long in order to avoid the possibility of an undesirable loosening of the support sheath, particularly if the hollow rod encased by the support sheath is wet with water.

It is an object of the present invention, therefore, to provide an article of manufacture which can be readily handled or manipulated uniformly comprising a hollow rod with a support sheath surrounding it, during the use of which in accordance with its intended purpose, an end section of the gathered tubing forming the hollow rod can be gripped in a simple manner and can be pulled out of the container while unfolding, without danger of damaging the tubing.

This object is achieved by providing an article of manufacture which can be manipulated uniformly comprising a one-piece, container-like, hollow, cylindrical support sheath of formable sheet material having integral end walls with a central opening in each end wall; and an open-ended hollow rod of longitudinally gathered tubing disposed in the hollow interior of the support sheath with the support sheath surrounding the hollow rod while leaving the opening into the hollow rod free, said integral end walls comprising permanently shaped folds formed from longitudinally axially twisted and longitudinally compressively buckled end portions of said cylindrical support sheath while leaving a straight, central, longitudinal axial free space open at both ends.

The front walls which serve as end closures of the hollow space or cavity of the support sheath are constructed as permanently shaped, axially twisted and buckled end portions of the longitudinal support sheath. The longitudinal axial support sheath twistings project outward and then are buckled under longitudinal compression. The front or end walls have central, longitudinally axial free spaces which are open at the two ends, like a passage. This structure is hereinafter referred to as "permanently formed support sheath twistings".

The permanently formed support sheath twistings are characterized by a spatial structure which is produced when the preferably equally long end sections of a straight section of a cross-sectionally circular tubular sheath of formable sheeting are twisted rotationally by at least 30° around their longitudinal axes in such a manner that a fold with a helical edge forms around the periphery of each of the end sections of the tubular sheath. The twisting is provided with a longitudinal axial, straight, central free space open at both ends, as a passage. The twisted ends are then buckled and the sheath compacted by longitudinally compressing the helical folds while simultaneously maintaining the central, longitudinal axial free spaces open at the two ends. The shape of the longitudinally twisted and buckled, compacted sheath ends is then made permanent by means of shape-fixing measures. The hollow rod which is to be encased by the support sheath is disposed in the hollow space of the sheath.

The longitudinal axes of the twistings and the axes of the central free spaces open at the two ends are aligned with the longitudinal axis of the sheath.

In this process, the longitudinal buckling compression of the outwardly projecting longitudinally axially twisted sheath ends takes place in the direction of the end faces of the hollow rod disposed in the hollow cavity of the tubular sheath with the ends of the hollow rod serving as thrust supports.

The buckled support sheath twistings with permanent shape (i.e., the straight, central free spaces of the sheath, the outer openings of which constitute the central openings of the end walls) have an inside diameter which is smaller than the remainder of the support sheath, or is smaller than the outer diameter of the hollow rod. Thus, the end walls constructed in accordance with the invention ensure that the shape and position of a hollow rod in the hollow cavity of the support sheath are fixed, and simultaneously that the unfolded tubular sheath can be removed from the hollow cavity of the support sheath through the central openings of the end walls.

The outsides of the end walls can be provided with annular turned-over portions or cuffs formed by bending the longitudinally axially twisted and longitudinally compressed sheath end regions outwardly, adjacent the opening of the sheath, and by fusing the turned-over layer to the underlying material.

The extent of longitudinal axial twisting of the end sections of the tubular sheath determines the width and the thickness of the end wall areas. The inside diameters of the central, straight free spaces of the permanently shaped support sheath twisting, and the diameter of the central openings of the end walls are also determined by the extent of twisting of the sheath end sections.

In accordance with the special construction of the permanently shaped, twisted support sheath ends, the central openings of the support sheath end walls are bounded by a plurality of sheet edges which extend in planes perpendicular to the longitudinal axis of the sheath. The support sheath end walls consist of a plurality of sheet folds which partially overlap one another.

The expression "permanently shaped" as used in the specification and claims of this application means that the thusly designated structural elements of the support sheath have a form or structural design which cannot change of its own accord.

The container-like support sheath serves to fix the shape of a hollow rod disposed in its hollow interior space. The end walls of the sheath function to prevent undesirable longitudinal expansion of the hollow rod or changing of its shape, particularly after the hollow rod has been soaked with water in the support sheath. The central opening in the end wall of the support sheath facilitates simple removal of the packing tube with simultaneous unfolding of the hollow rod.

The casing of the support sheath (i.e., the piece of sheathing from which the support sheath is produced) comprises a hollow interior cavity having a circular cross-section, the diameter of which matches the outside diameter of the rod.

The support sheath, or the piece of sheathing, is made of formable sheet material. The term "formable sheet material" is intended to include flexible sheets of thermoplastic, fusible polymers—such as polyvinyl chloride or, preferably, polyethylene—as well as suitably thin metal foils, such as aluminum foil. Support sheaths of synthetic, thermoplastic polymer are particularly preferred. The term "formable sheet material" also includes tubing of net-like construction, such as net-like tubes of polyethylene material.

The container-like support sheath is of one piece and comprises a straight casing in the shape of a hollow cylinder. Each end of the hollow space of the cylinder is bounded by end walls integral with the support sheath constructed with central openings in a characteristic fashion.

The respective end walls preferably have an identical spatial design and, advantageously, are of identical dimensions.

The central openings of the end walls preferably have a shape and size which, when the article is used for its intended purpose, permits the filling tube of a filling machine to be easily introduced into the hollow space of the rod through the opening in the container end wall. At the same time, the end walls are constructed in such a manner that they ensure that the shape and the position of the hollow rod in the hollow interior cavity of the support sheath will be fixed.

The central openings in the ends of the support sheath are arranged in such a manner, with respect to one another, that their centers are located on a straight line which coincides with the longitudinal axis of the hollow space of the rod.

The inside of the support sheath casing lies either directly adajcent the outside of the hollow rod or a small distance from it. The support sheath casing is at least as long as the hollow rod. If a certain amount of longitudinal expansion of a hollow rod of cellulose hydrate tubing, wet as a result of the article being soaked or moistened with water before being used for its intended purpose, is deemed desirable, the length of the support sheath can be modified accordingly.

The casing of the support sheath preferably is provided with a plurality of perforations which advantageously have identical shapes and dimensions. It is particularly advantageous if the perforations are uniformly distributed over the whole length and circumference of the support sheath casing. The perforations permit the hollow rod in the hollow interior cavity of the container to be soaked more quickly with moistening liquid during the use of the article for its intended purpose. The number, shape and size of the perforations in the support sheath casing must be selected in such a manner that the shape- and position-fixing functions of the sheath are not detrimentally affected by the perforations.

The wall thickness of the support sheath is not critical as long as it does not adversely affect the desired characteristics and protective functions of the sheath. If the support sheath, in its preferred embodiment, is made of polyethylene film, the film advantageously may have a thickness in the range of between about 100 and 250 $\mu$m.

In the following text, an example of a process is described which can be used to produce the article of manufacture of the present invention.

A straight mandrel with stable shape is disposed as a support element in the hollow interior space of a hollow rod of a longitudinally gathered packing tube, such as a tube of fiber-reinforced cellulose hydrate. The length of the mandrel is such that it projects from both ends of the hollow space of the rod. A hollow cylindrical sheath of formable sheet material, such as polyethylene, is then arranged around the hollow rod. The length of the sheath is such that its end sections project past the ends of the hollow rod. The projecting parts of the sheath preferably are equal in length. The inside diameters of the sheath ends preferably match the outside diameter of the hollow rod.

The ends of the projecting parts of the sheath, which may have, for example, a length corresponding to three times the sheath diameter, are gripped by means of gripping tools constructed in the shape of tongs. By turning the tools appropriately, the end sections of the sheath are placed under torsion around their longitudinal axis as the axis of rotation, for example by 30°, while partially twisting them.

After that, the tong-like tools are used as stamping tools to press the twisted end sections of the sheath toward the ends of the hollow rod and against the rod ends which serve as thrust supports. The twisted end sections are thereby caused to buckle longitudinally. Subsequently, the shape of the longitudinally axially twisted and then longitudinally compressed projecting parts of the sheath is made permanent.

When a tubular sheath of heat-formable sheet material of fusible polymer, such as a polyethylene film, is used, the shape of the twisted and buckled end portions can be permanently fixed by first applying heat at a sufficient temperature to the end sections of the sheath to render them heat-formable and fusible. While in the heat-formable state, the end sections of the sheath are twisted longitudinally axially and immediately thereafter are buckled longitudinally. The buckled twistings are then cooled under conditions which allow them to retain their shape. This can be done, for example, by holding them in the twisted and buckled state with the tong-like tool and by then cooling the twisted and buckled ends until their shape and structure are stable at room temperature, even after the holding force has been removed. The cooling can be performed, for example, by blowing cold air on the twisted and buckled ends.

In the described method for producing the article of manufacture of the present invention, it is advantageous to arrange the hollow rod with the sheath surrounding it in a holding device in a preferably horizontal position. While performing the process, a support mandrel can be disposed in the hollow space of the hollow rod. The mandrel should be at least as long as the piece of the sheathing surrounding the hollow rod.

With the preferred use of flexible thermoplastic sheathing, especially polyethylene, for the support sheath, it is necessary after the folds are formed to firmly join the sides of the folds to one another in order to construct folds with a permanent shape.

The invention is further described with reference to the accompanying drawing, the single FIGURE of which is a lateral perspective view of the article of manufacture of the invention.

In the FIGURE, reference character A denotes the support sheath, and reference character B identifies the hollow rod in the hollow inside cavity of the sheath.

The hollow cylindrical casing of the support sheath is designated by 1. The permanently shaped integral end wall of the sheath is designated by reference numeral 2. The transition area from the hollow cylindrical casing 1 to the end wall 2 is identified by reference numeral 3. Reference numeral 4 denotes a central opening in the end wall 2. The folds partially overlapping the end wall are designated by 5. Reference numeral 6 identifies one edge of the fold 5. The free edge of an end wall surface is denoted by reference numeral 7. Reference numeral 8 identifies the hollow space of the hollow rod B, and 9 designates the openings leading into hollow space 8. Reference numeral 10 designates one end face of the hollow rod, and 11 identifies the outside of the hollow rod.

The foregoing description has been set forth by way of example and not by way of limitation. Since modifications of the disclosed embodiments within the scope and spirit of the invention may occur to persons skilled in the art, the scope of the invention is to be construed solely with respect to the appended claims.

What is claimed is:

1. An article of manufacture comprising a one-piece container-like hollow cylindrical support sheath and an open-ended hollow rod of longitudinally gathered cellulose hydrate tubing disposed in the interior of said support sheath with the support sheath surrounding said hollow rod while leaving the open end of the hollow rod free; said hollow rod constituting a formed, but unutilized, sausage casing; said support sheath being made from a formable, flexible sheet of fusible, thermoplastic polymer material and being disposed around said hollow rod with the length of said sheath being such that the ends of the sheath project outwardly beyond the ends of the hollow rod; said outwardly projecting sheath ends being rotationally twisted around their longitudinal axis by at least 30° and buckled to form a plurality of permanently shaped, partially overlapping helical folds whereby the inside diameters of the projecting ends of said sheath are partially narrowed to form integral sheath end walls with a center opening in each end wall; said folds being longitudinally compressed to compact said sheath while maintaining a straight, central, longitudinally axial free space at both ends as a passage for removing with simultaneous unfolding the tubing of the hollow rod from the interior of the support sheath; adjacent folds being at least partially fused to firmly join them to each other and to make the shape of the integral end walls permanent; said end wall ensuring that the shape and position of the hollow rod in the interior of the support sheath are fixed when the hollow rod is soaked in water or moistened.

2. Article according to claim 1, wherein the support sheath is made of a polyethylene film having a thickness in the range from about 100 to about 250 μm.

* * * * *